US012637956B2

(12) United States Patent
Cronin

(10) Patent No.: US 12,637,956 B2
(45) Date of Patent: May 26, 2026

(54) THERMAL BARRIER COATING FOR EDGE COMPONENT

(71) Applicant: RTX Corporation, Farmington, CT (US)

(72) Inventor: Brian Cronin, Manchester, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/890,013

(22) Filed: Sep. 19, 2024

(65) Prior Publication Data

US 2026/0078685 A1 Mar. 19, 2026

(51) Int. Cl.
*F01D 11/12* (2006.01)

(52) U.S. Cl.
CPC ........ *F01D 11/122* (2013.01); *F05D 2230/90* (2013.01); *F05D 2240/11* (2013.01); *F05D 2300/6033* (2013.01); *F05D 2300/611* (2013.01)

(58) Field of Classification Search
CPC .... F01D 11/12; F01D 11/122; F05D 2230/90; F05D 2240/11; F05D 2300/6033; F05D 2300/611
See application file for complete search history.

(56) References Cited

U.S. PATENT DOCUMENTS

| | | | | |
|---|---|---|---|---|
| 7,563,071 | B2 * | 7/2009 | Campbell | F01D 9/04 415/173.1 |
| 9,718,735 | B2 * | 8/2017 | Delvaux | F01D 5/284 |
| 9,945,242 | B2 * | 4/2018 | Tura | F02C 3/04 |
| 11,098,399 | B2 * | 8/2021 | Paulino | F01D 11/122 |
| 11,131,206 | B2 * | 9/2021 | Strock | B23P 15/008 |
| 11,519,283 | B2 * | 12/2022 | Roy Thill | F01D 25/005 |
| 11,913,340 | B2 * | 2/2024 | Johnson | F01D 11/24 |
| 12,110,798 | B1 * | 10/2024 | Rogers | C04B 41/009 |
| 12,188,365 | B1 * | 1/2025 | Thomas | F01D 11/08 |
| 12,228,033 | B1 * | 2/2025 | Micucci | F01D 11/08 |

(Continued)

FOREIGN PATENT DOCUMENTS

| | | | |
|---|---|---|---|
| EP | 3913193 | A1 | 11/2021 |
| WO | 2019112662 | A1 | 6/2019 |

OTHER PUBLICATIONS

Mullite Material Properties—MatWeb website—https://matweb.com/search/DataSheet.aspx?MatGUID=6ff3fda0bf744c93b4e423806faec494&ckck=1 (Year: 2025).*

(Continued)

*Primary Examiner* — Brian P Wolcott
(74) *Attorney, Agent, or Firm* — Christopher B. Kilner; Millen, White, Zelano & Branigan, P.C.

(57) ABSTRACT

A ceramic matric composite (CMC) component for a gas turbine engine, such as blade outer air seal (BOAS), may be shielded from thermal stress. The CMC component includes a first surface configured for exposure to a hot gas stream, a second surface configured for exposure to a cold gas stream, an edge surface of the CMC component disposed between and connecting the first and second surfaces. At least one coating layer is disposed on the first surface and wrapped over the edge surface and the second surface, wherein the at least one coating layer disposed on the second surface has a lower thermal conductivity than the CMC component so as to reduce a thermal gradient between the cooled first surface and the heated second surface.

16 Claims, 6 Drawing Sheets

(56) References Cited

U.S. PATENT DOCUMENTS

| | | | | |
|---|---|---|---|---|
| 2007/0077141 | A1 * | 4/2007 | Keller | F01D 11/08 415/136 |
| 2010/0104426 | A1 * | 4/2010 | Keller | F01D 11/12 415/173.1 |
| 2017/0152749 | A1 | 6/2017 | Bunker et al. | |
| 2024/0247594 | A1 | 7/2024 | White, III et al. | |

OTHER PUBLICATIONS

Naslain, R.R. (2005), SiC-Matrix Composites: Nonbrittle Ceramics for Thermo-Structural Application. International Journal of Applied Ceramic Technology, 2: 75-84. https://doi.org/10.1111/j.1744-7402.2005.02009. (Year: 2005).*

European Search Report dated Feb. 11, 2026 issued in corresponding application 25203504.3.

* cited by examiner

THERMAL BARRIER COATING FOR EDGE COMPONENT

FIELD OF THE INVENTION

The subject matter disclosed herein relates to reducing thermal stress in ceramic matrix composite (CMC) components and, in particular, to wrapping coatings used on a hot portion of a CMC component around an edge to provide a thermal barrier on a cold side of the component.

BACKGROUND OF THE INVENTION

Many gas turbine engine components are subject to high thermal stress due to a high thermal gradient resulting from exposure of the component to hot gas on a first side and cooling air on an opposite side.

For example, with reference to FIG. 5, a CMC blade outer air seal (BOAS) 101 for a gas turbine engine may have a leading edge 131 between an inner surface 111 in the hot gas path 112 of the gas turbine engine and an outer surface 121 subject to a cooling air path 122. The inner surface 111 may have an abradable coating 150 applied thereto to provide a proper interface with turbine blade 200. While illustrated on the entire inner surface 111, in most cases the abradable coating will be limited to the region adjacent the turbine blade 200. The hot gas path 112 and the cooling air path 122 cause a thermal gradient between inner surface 111 and the outer surface 121 which may lead to a high thermal stress in the area of leading edge 131.

One way to address this issue may be to add structure to block or divert the cooling air path 122 from outer surface 111. However, such a solution requires the addition of structure that may adversely affect space, assembly, weight, and/or cost parameters.

The above information disclosed in this Background section is only for understanding of the background of the inventive concepts and, therefore, it may contain information that does not constitute prior art.

SUMMARY OF THE INVENTION

The present disclosure is directed, in a first aspect, to a CMC component for a gas turbine engine that includes a first surface of the CMC component that is configured for exposure to a hot gas stream, a second surface of the CMC component that is disposed opposite the first surface and configured for exposure to a cold gas stream, an edge surface of the CMC component disposed between and connecting the first and second surfaces, and at least one coating layer disposed on the first surface and wrapping over the edge surface and the second surface, wherein the at least one coating layer disposed on the second surface has a lower thermal conductivity than the CMC component.

In an embodiment of the CMC component, the at least one coating layer may include a first coating layer disposed on the first surface, the edge surface, and the second surface.

In another embodiment of the CMC component, the at least one coating layer may include a second coating layer disposed on the first coating layer disposed on the first surface, the edge surface, and the second surface.

In a further embodiment of the CMC component, the at least one coating layer may include a second coating layer disposed on the first coating layer disposed on the first surface and a first portion of the edge surface.

In yet another embodiment of the CMC component, the at least one coating layer may include a first coating layer disposed on the first surface and a first portion of the edge surface, and a second coating layer disposed on a second portion of the edge surface and the second surface.

In an embodiment of the CMC component, the at least one coating layer may include an abradable coating layer.

In another embodiment of the CMC component, the at least one coating layer may include a thermal barrier layer.

In a further embodiment of the CMC component, the at least one coating layer may include an environmental barrier layer.

In yet another embodiment of the CMC component, the at least one coating layer may include a machinable coating layer.

In an embodiment of the CMC component, the CMC component may be a blade outer air seal (BOAS).

The present disclosure is directed, in a second aspect, to a method of thermally shielding a CMC component for a gas turbine engine to reduce thermal stress. The method includes applying at least one coating layer to a first surface of the CMC component, the first surface configured for exposure to a hot gas stream, applying the at least one coating layer to an edge surface of the CMC component disposed between and connecting the first surface and a second surface of the CMC component, and applying the at least one coating layer to the second surface, the second surface disposed opposite the first surface and configured for exposure to a cold gas stream, wherein the at least one coating layer applied to the second surface has a lower thermal conductivity than the CMC component.

In an embodiment of the method, applying the at least one coating layer may include applying a first coating layer onto the first surface, the edge surface, and the second surface.

In another embodiment of the method, applying the at least one coating layer may include applying a second coating layer onto the first coating layer disposed on the first surface, the edge surface, and the second surface.

In a further embodiment of the method, applying the at least one coating layer may include applying a second coating layer onto the first coating layer disposed on the first surface and a first portion of the edge surface.

In yet another embodiment of the method, applying the at least one coating layer may include applying a first coating layer onto the first surface and a first portion of the edge surface, and applying a second coating layer onto a second portion of the edge surface and the second surface.

In an embodiment of the method, applying the at least one coating layer may include applying an abradable coating layer.

In another embodiment of the method, applying the at least one coating layer may include applying a thermal barrier layer.

In a further embodiment of the method, applying the at least one coating layer may include applying an environmental barrier layer.

In yet another embodiment of the method, applying the at least one coating layer may include applying a machinable coating layer.

The present disclosure is directed, in a second aspect, to a method of thermally shielding a CMC blade outer air seal (BOAS) for a gas turbine engine to reduce thermal stress. The method includes applying at least one coating layer to a first surface of the CMC BOAS, the first surface configured for exposure to a hot gas stream, applying the at least one coating layer to an edge surface of the CMC BOAS disposed between and connecting the first surface and a second surface of the CMC BOAS, and applying the at least one coating layer to the second surface, the second surface disposed opposite the first surface and configured for exposure to a cold gas stream, wherein the at least one coating layer applied to the second surface has a lower thermal conductivity than the CMC BOAS.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION OF THE INVENTION

Figure 1:
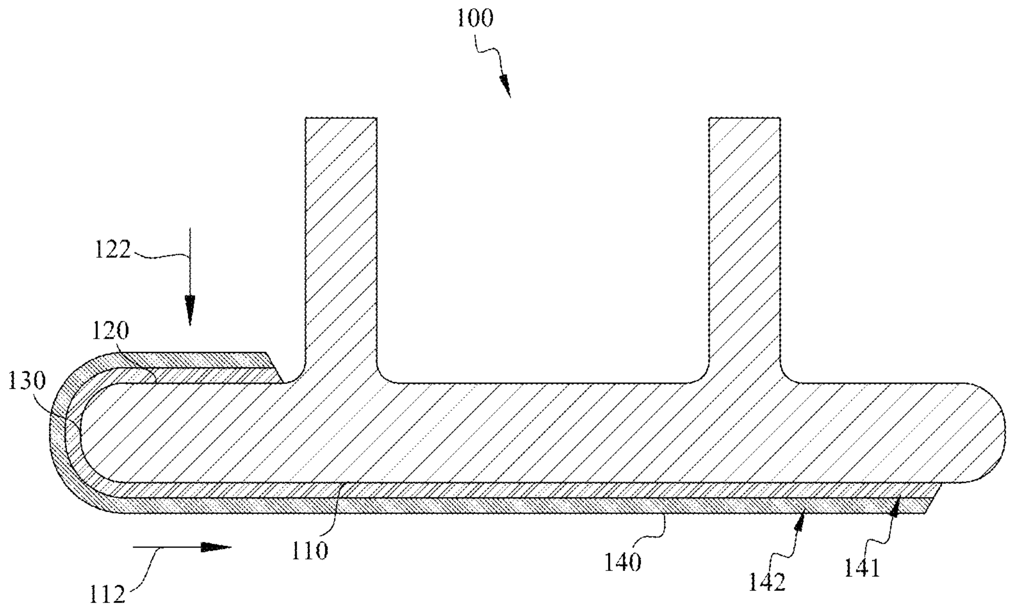
FIG. 1 is a schematic illustration of a cross-section of a CMC component is accordance with a first embodiment of the present disclosure.

The embodiments of the present disclosure can comprise, consist of, and consist essentially of the features and/or steps described herein, as well as any of the additional or optional ingredients, components, steps, or limitations described herein or would otherwise be appreciated by one of skill in the art. It is to be understood that all concentrations disclosed herein are by weight percent (wt. %.) based on a total weight of the composition unless otherwise indicated.

The following discussion omits or only briefly describes conventional features of the disclosed technology that are apparent to those skilled in the art. Reference to various embodiments does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. A person of ordinary skill in the art would know how to use the instant invention, in combination with routine experiments, to achieve other outcomes not specifically disclosed in the examples or the embodiments.

Unless otherwise specifically defined herein, all terms are to be given their broadest possible interpretation including meanings implied from the specification as well as meanings understood by those skilled in the art and/or as defined in dictionaries, treatises, etc. Unless defined otherwise, all technical and scientific terms used herein have the same meaning as commonly understood by one of ordinary skill in the art in the field of the disclosed technology. It must also be noted that, as used in the specification and the appended claims, the singular forms "a," "an," and "the" include plural referents unless otherwise specified, and that the terms "includes" and/or "including," when used in this specification, specify the presence of stated features, elements, and/or components, but do not preclude the presence or addition of one or more other features, steps, operations, elements, components, and/or groups thereof. Additionally, methods, equipment, and materials similar or equivalent to those described herein can also be used in the practice or testing of the disclosed technology.

The devices of the present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. All spatial references, such as, for example, proximal, distal, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior."

It will further be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

Various examples of the disclosed technology are provided throughout this disclosure. The use of these examples is illustrative only, and in no way limits the scope and meaning of the invention or of any exemplified form. Likewise, the invention is not limited to any particular preferred embodiments described herein. Indeed, modifications and variations of the invention may be apparent to those skilled in the art upon reading this specification, and can be made without departing from its spirit and scope. The invention is therefore to be limited only by the terms of the claims, along with the full scope of equivalents to which the claims are entitled.

The present disclosure is directed to providing a thermal shield to reduce thermal stress on a CMC gas turbine engine component. The thermal shield is provided by a using, or adding to, one or more coating layers disposed on a first side of the component that is subject to a hot gas flow so as to wrap around an edge and provide at least some thermal insulation to a second side of the component that is subject to a cooling air flow.

Referring to FIG. 1, in a first embodiment of the present disclosure, a CMC component 100, such as a CMC BOAS for a gas turbine engine (not shown) may include a first surface 110. The first surface 110 of the CMC component 100 is configured for exposure to a hot gas stream 112. The CMC component 100 may also include a second surface 120 disposed opposite the first surface 110. The second surface 120 is configured for exposure to a cold gas stream 122.

An edge surface 130 of the CMC component 100 may be disposed between and connect the first and second surfaces 110 and 120, respectively. At least one coating layer 140 is disposed on the first surface 110. The at least one coating layer 140 is continued from the first surface 110 and wraps over the edge surface 130 and the second surface 120. The portion of the at least one coating layer 140 disposed on the second surface 120 is configured to have a lower coefficient of thermal conductivity than that of the CMC component 100.

The lower coefficient of thermal conductivity of the coating layer 140 disposed on the second surface 120 permits the at least one coating layer 140 to act as a thermal shield that may reduce the thermal gradient of the CMC component 100 in the area near edge surface 130 between the first and second surfaces 110 and 120, respectively.

In the first embodiment of the present disclosure illustrated in FIG. 1, the at least one coating layer includes a first coating layer 141 disposed on the first surface 110, the edge surface 130, and the second surface 120. In this embodiment, the at least one coating layer 140 further includes a second coating layer 142 disposed on the first coating layer 141 such that it is also disposed on the first surface 110, the edge surface 130, and the second surface 120.

In such an embodiment, one of the first coating layer 141 or the second coating layer 142 needs to have a coefficient of thermal conductivity lower than that of the CMC component. Thus, for example, the coefficient of thermal conductivity of the second coating layer 142 may not necessarily need to be lower than that of the CMC component, as may be the case with some abradable coatings.

Figure 2:
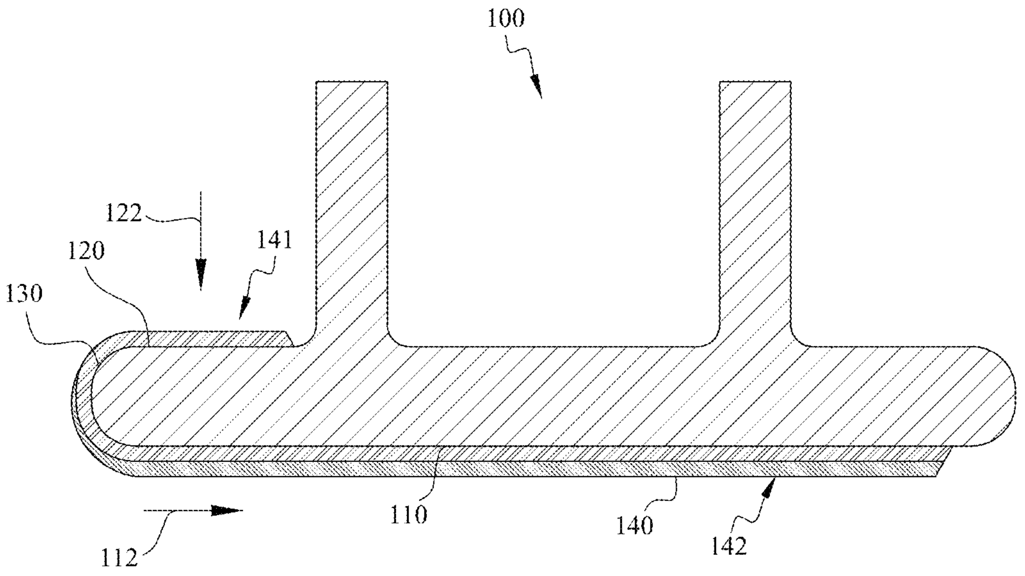
FIG. 2 is a schematic illustration of a cross-section of a CMC component is accordance with a second embodiment of the present disclosure.

Referring to FIG. 2, in a second embodiment of the present disclosure, the at least one coating layer 140 includes a second coating layer 142 disposed on the first coating layer 141 so as to be disposed on the first surface 110 and a first portion of the edge surface 130. Thus, in this embodiment, a first coating layer 141 covers the first surface 110, the edge surface 130, and the second surface 120. A second coating layer 142 is then applied to or otherwise disposed on the first surface 110 and a portion of the edge surface 130. The portion of second coating layer 142 on edge surface 130 may be tapered and may terminate at any suitable point on the edge surface 130. Thus, only the first coating layer 141 is disposed on the second surface 120 to provide thermal shielding from cooling air path 122.

In such an embodiment, only the first coating layer 141 needs to have a coefficient of thermal conductivity lower that that of the CMC component. Thus, the coefficient of thermal conductivity of the second coating layer 142 does not necessarily need to be lower than that of the CMC component, as may be the case with some abradable coatings.

Figure 3:
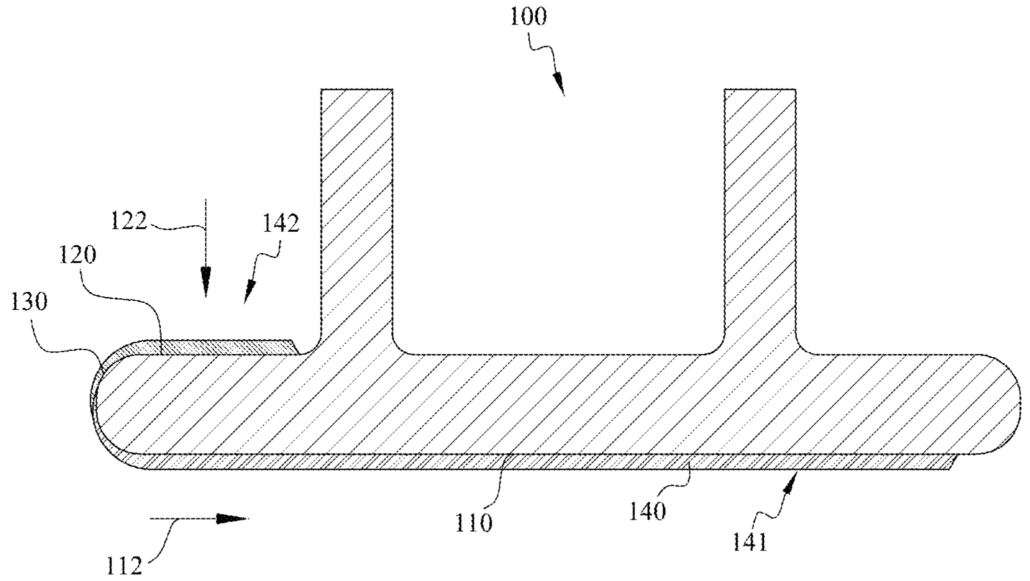
FIG. 3 is a schematic illustration of a cross-section of a CMC component is accordance with a third embodiment of the present disclosure.

Referring to FIG. 3, in a third embodiment of the present disclosure, the at least one coating layer 140 may include a first coating layer 141 disposed on the first surface and a first portion of the edge surface 130, and a second coating layer 142 may be disposed on a second portion of the edge surface 130 and the second surface 120. The portion of first coating layer 141 and/or the portion of the second coating layer 142 on edge surface 130 may be tapered and may terminate at any suitable point on the edge surface 130. In an embodiment, both coating layers are tapered and blend into each other such that the at least one coating layer 140 maintains a substantially uniform thickness.

Figure 4:
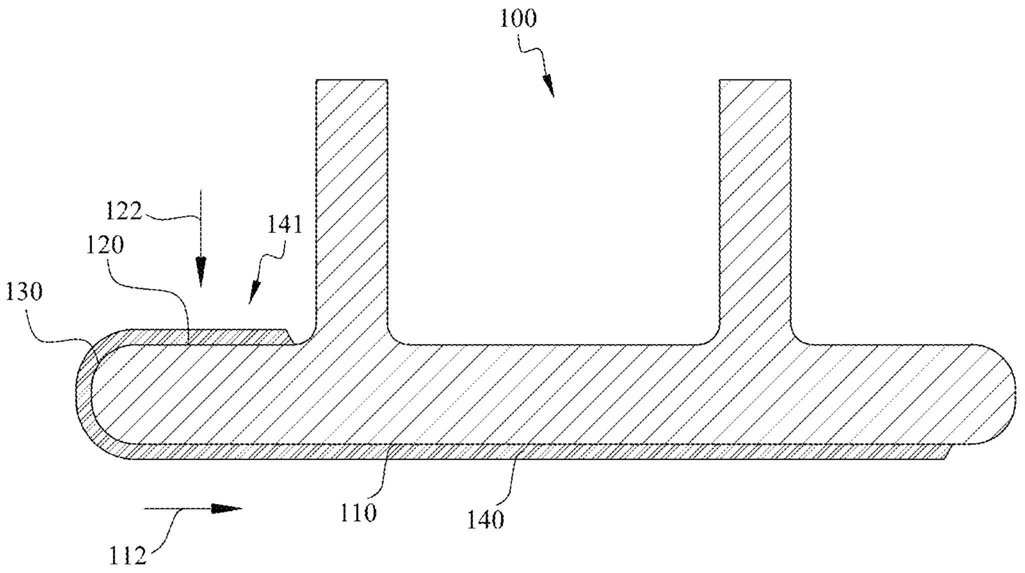
FIG. 4 is a schematic illustration of a cross-section of a CMC component is accordance with a fourth embodiment of the present disclosure.

Referring to FIG. 4, in a fourth embodiment of the present disclosure, the at least one coating layer 140 may be a singular layer that is disposed on the first side 110 and wraps around the edge 130 so as to be disposed on both the edge surface 130 and the second surface 120. In such as case, the singular layer 140 must have a coefficient of thermal conductivity lower than that of the CMC component 100 in order to provide the thermal shielding function.

Figure 5:
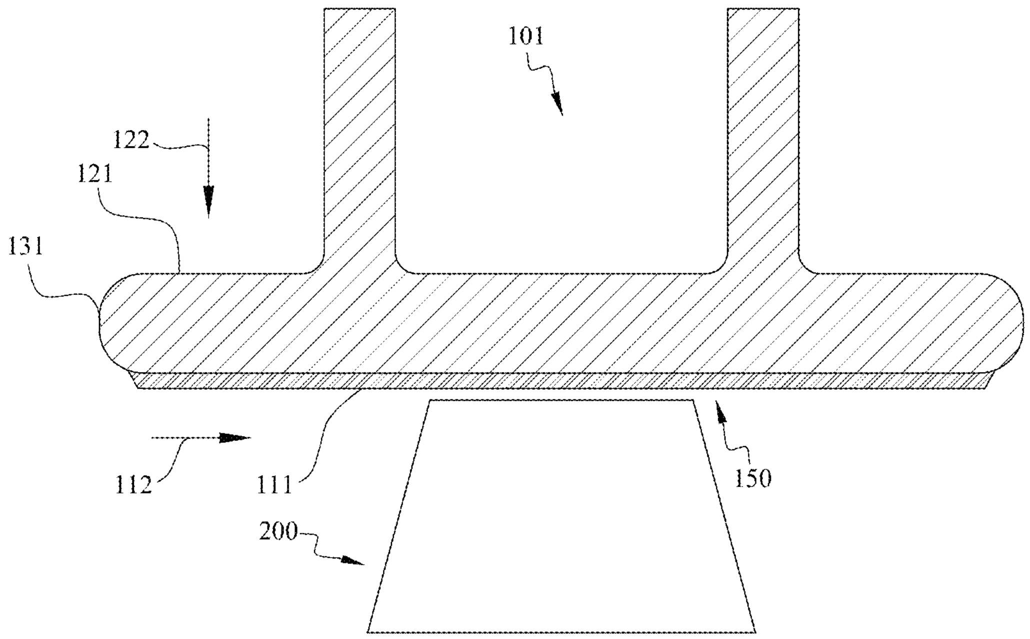
FIG. 5 (PRIOR ART)
FIG. 5 is a schematic illustration of a cross-section of a CMC component is accordance with the Prior Art.

In various embodiments of the present disclosure, the at least one coating layer 140 may include an abradable coating layer. For example, in an embodiment related to a CMC BOAS, it may be desirable to have the at least one coating layer 140 closest to the turbine blade 150 (see FIG. 5) be an abradable coating layer, as is known in the art.

In an example, an abradable coating layer may be formed from a matrix material that comprises dislocator materials in the form of feed particles that may "abrade" from the matrix. For example, an abradable coating layer may include a matrix material selected from hafnon, mixtures of hafnon and zircon, and rare earth disilicates ($RE_2Si_2O_7$), wherein RE is Sc, Y, La, Ce, Pr, Nd, Pm, Sm, Eu, Gd, Tb, Dy, Ho, Er, Tm, Yb, or Lu, and one or more dislocator materials selected from ceramic materials having a Mohs hardness of less than or equal to 6.

In an embodiment, the feed particles for the dislocator materials may be, for example, selected from hafnium silicate, zirconium silicate, rare earth silicates, rare earth phosphates, aluminosilicates, or $HfO_2$—$SiO_2$-rare earth oxide, which in each case may be stoichiometric or non-stoichiometric, and combinations thereof (for example, silica-rich Hf silicate, $HfSiO_4$, a silica-rich Zr-silicate, $ZrSiO_4$, a rare earth monosilicate ($RE_2SiO_5$), a rare earth disilicate ($RE_2Si_2O_7$), a rare earth phosphate ($REPO_4$) powder, mullite, anorthite, sodium aluminosilicate, or any combination thereof, wherein RE is Sc, Y, La, Ce, Pr, Nd, Pm, Sm, Eu, Gd, Tb, Dy, Ho, Er, Tm, Yb, or Lu). Additionally, the feed particles for abradable coatings can be a hafnia or zirconia stabilized (partially or fully) by the addition of another component, for example, stabilized by an alkaline or rare earth metal), such as yttrium-stabilized-zirconia ($Y_2O_3$-stabilized $ZrO_2$), magnesium-stabilized-zirconia, calcium-stabilized-zirconia, cerium-stabilized-zirconia, and/or combinations thereof.

In another embodiment, the feed particles can be made of mixtures so that the resultant agglomerated particles are mixtures of two or more materials. For example, for abradable coatings, the feed particles may be a mixture of rare earth disilicates and hafnon, a mixture hafnon and zircon, or a mixture of rare earth monosilicates and rare earth disilicates. For EBC coatings, the powder particles can be made of a mixture of one or more rare earth disilicates ($RE_2$ $Si_2O_7$), e.g., $YbSi_2O_7$, and hafnon ($HfSiO_4$), or a mixture of one or more rare earth disilicates ($RE_2$ $Si_2O_7$), hafnon ($HfSi_sO_4$), and zircon ($Zr$ $SiO_4$), wherein RE is Sc, Y, La, Ce, Pr, Nd, Pm, Sm, Eu, Gd, Tb, Dy, Ho, Er, Tm, Yb, or Lu. For example, the powder particles can contain a mixture of 50%-90% rare earth disilicates ($RE_2$ $Si_2O_7$) and 10%-50% hafnon ($HfSiO_4$) or 10%-50% of a mixture of one or more rare hafnon ($HfSiO_4$) and zircon ($Zr$ $SiO_4$).

In addition, in the case of powder compositions for abradable coatings, the feed particles can include other agents such as dislocator materials or pore forming materials. Dislocator materials impact the internal mechanical strength of the coating. The dislocator material may, for example, provide a mechanical mismatch with the matrix material enhancing abradability within the matrix or along the dislocator/matrix interfaces, or may have a lower shear strength than the matrix and thereby aid abradability through deformation within the dislocator phase and along the dislocator/matrix interfaces. The pore forming agents are incorporated into the abradable coatings during spraying and are then subsequently removed by heating.

The choice of dislocator material will depend on the matrix material of the abradable coating. Dislocator materials can be selected from aluminosilicates (e.g., mullite, anorthite), hexagonal boron nitride (hBN), alkaline earth tungstate ($MWO_4$), alkaline earth molybdates ($MMOO_4$), rare earth phosphates ($REPO_4$), and combinations thereof, wherein M is Mg, Ca, Sr, or Ba, and RE is Sc, Y, La, Ce, Pr, Nd, Pm, Sm, Eu, Gd, Tb, Dy, Ho, Er, Tm, Yb, or Lu, such as, $CaWO_4$, $BaWO_4$, $ZnWO_4$, $BaMoO_4$, $SrMoO_4$, $YPO_4$, or $LaPO_4$.

Pore forming materials can be, for example, a polymer such as a polyester or a polymethylmethacrylate.

Material selection for reducing the coefficient of thermal conductivity of the abradable coating layer may only be necessary and/or applicable in embodiments where the abradable coating layer is the only coating layer disposed on the second surface 120 of the CMC component 100.

In one or more embodiments, the at least one coating layer 140 may include a thermal barrier coating (TBC) layer and/or an environmental barrier coating (EBC) layer. The TBC layer and/or EBC layer may be disposed directly on the CMC component 100 or on a prior coating layer of the at least one coating layer 140. In at least one instance, the TBC and/or EBC helps protect the portion of the CMC component 100 near edge portion 130 from experiencing high thermal stress and from degrading under the high temperatures. In at least one embodiment, the TBC and/or EBC may be disposed onto the CMC component 100 using any technique capable of depositing, adhering and coating the TBC and/or EBC onto the composite. For example, suitable deposition techniques may include, but are not limited to, chemical vapor infiltration (CVI), chemical vapor deposition (CVD), atomic layer deposition (ALD), physical vapor deposition (PVD), electron-beam physical vapor deposition (EBPVD), individually, and combinations thereof.

In at least one embodiment, the TBC layer may include a bond coat and at least one ceramic layer. The bond coat may be a diffusion or overlay bond coat comprising, for example, an aluminide or MCrAlY, where M can be iron, cobalt, nickel, individually, or combination thereof. In at least one instance, a surface of the bond coat may be roughened, such as by grit blasting or peening, to improve adhesion of the ceramic layer to be deposited thereupon. The ceramic layer may have a single layer or multiple layers of material and may include layers of differing chemical composition. For example, the ceramic layer may include an inner yttrium stabilized zirconia (YSZ) layer deposited on bond coat and an outer gadolinium-stabilized zirconium (GDZ) layer deposited on the YSZ layer.

In at least one embodiment, the EBC layer may comprise at least one low conductivity coating layer(s). The EBC, for example, may have a coefficient of thermal conductivity capable of reducing the formation of thermal stresses in the exemplary CMC component 100. In at least one embodiment, the EBC layer may comprise a first layer that may include silicon or silica, and at least one or more secondary layers that may include any of the following: a rare earth silicate layer, a yttrium monosilicate, a mullite layer; a mullite and alkaline earth aluminosilicate layer; a barium strontium aluminosilicate layer, a ytterbium based layer, other similar materials, individually, and combinations thereof.

EBC layers, TBC layers, and abradable coating layers may also be prepared by plasma spraying using powders. Typical plasma spraying processes include air or atmospheric plasma spraying (APS), vacuum plasma spraying (VPS), low pressure plasma spraying (LPPS), shrouded plasma spraying, suspension plasma spraying (SPS), and hybrid forms thereof. These coatings are often made from a combination of materials. In the air plasma spaying process the powders of the different materials are typically combined together and introduced into the plasma flame or plasma jet as a blended mixture.

In one or more further embodiments, the at least one coating layer 140 may include a machinable coating layer, such as mullite, which may be disposed on the CMC component 100 in any suitable manner.

In the schematic illustrations of FIGS. 1-4, the CMC component 100 is depicted as a blade outer air seal (BOAS). When CMC component 100 is a CMC BOAS, embodiments of the present invention may reduce thermal stress in the leading-edge area of the CMC BOAS. However, embodiments of the present disclosure are not limited thereto, and the inventive concepts may be applied to other edge portions of the CMC BOAS subject to high thermal gradients, as well as to any other gas turbine engine CMC components 100 with a high thermal gradient near an edge of the CMC component 100.

Figure 6:
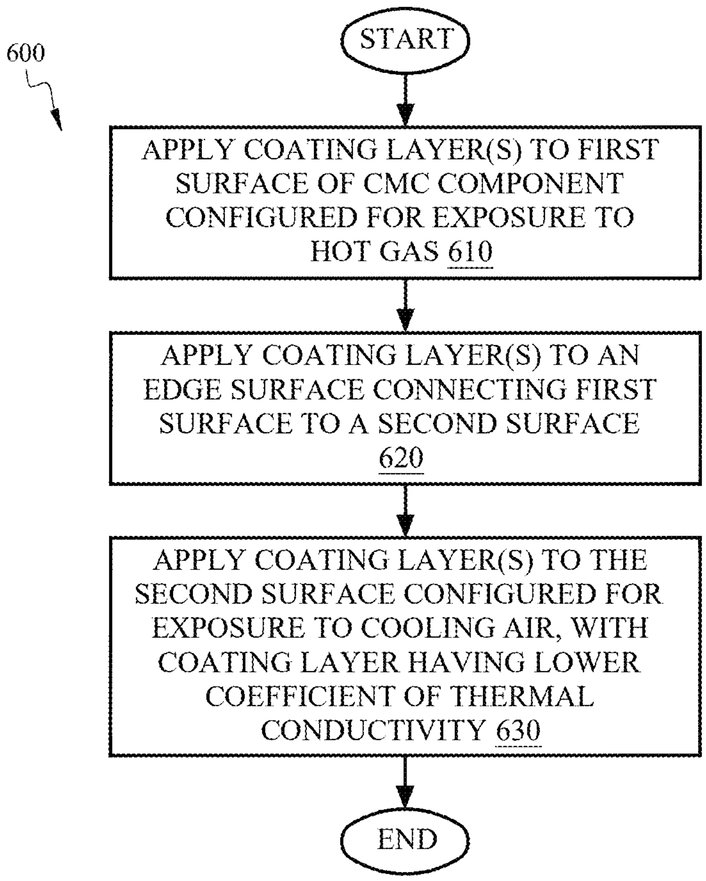
FIG. 6 is a flow diagram of a method in accordance with the present disclosure.

Referring to FIG. 6, one or more embodiments of the present disclosure further relate to method 600 of thermally shielding a CMC component 100 for a gas turbine engine to reduce thermal stress. Such embodiments include a step 610 of applying at least one coating layer 140 to a first surface 110 of the CMC component 100, the first surface 110 being a portion of the CMC component 100 that is configured for exposure to a hot gas path or stream 112. Embodiments also include a step 620 of applying the at least one coating layer 140 to an edge surface of the CMC component disposed between and connecting the first surface and second surface of the CMC component 100. A further step 630 includes applying the at least one coating layer 140 to the second surface 120 of the CMC component 100, the second surface 120 being disposed opposite the first surface 110 and configured for exposure to a cooling air path or stream 122, wherein the at least one coating layer 140 applied to the second surface 120 has a lower coefficient of thermal conductivity than that of the CMC component 100.

In an example embodiment of the thermal shielding method, the step of applying the at least one coating layer 140 may include applying a first coating layer 141 onto the first surface 110, the edge surface 130, and the second surface 120.

In a further embodiment of the above example embodiment, the step of applying the at least one coating layer 140 further includes applying a second coating layer 142 onto the first coating layer disposed on the first surface, the edge surface, and the second surface.

In another embodiment of the above example embodiment, the step of applying the at least one coating layer 140 further includes applying a second coating layer 142 onto the first coating layer 141 disposed on the first surface 110 and a first portion of the edge surface 130.

In another example embodiment of the thermal shielding method, the step of applying the at least one coating layer 140 may include applying a first coating layer 141 onto the first surface 110 and a first portion of the edge surface 130, and applying a second coating layer 142 onto a second portion of the edge surface 130 and the second surface 120.

In various embodiments of the thermal shielding method, the step of applying the at least one coating layer 140 may include applying an abradable coating layer, applying a TBC layer, applying an EBC layer, and/or applying a machinable coating layer, as well as any combinations thereof.

In yet further embodiments, the thermal shielding method may be applied to a CMC component in the form of a CMC BOAS, such as to reduce thermal stress in a leading-edge area of the CMC BOAS.

While the at least one coating layer 140 is disclosed and illustrated herein as comprising a first coating layer 141 or a first coating layer 141 together with a second coating layer 142, each of the first coating layer 141 and the second coating layer 142 in accordance with the present disclosure may further include multiple layers, and embodiments are not limited to first or first and second coating layers 141 and 142, and may include additional coating layers without departing from the scope of the invention.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A ceramic matrix composite (CMC) component for a gas turbine engine, comprising:

a first surface of the CMC component, the first surface configured for exposure to a hot gas stream;

a second surface of the CMC component disposed opposite the first surface, the second surface configured for exposure to a cold gas stream;

an edge surface of the CMC component disposed between and connecting the first and second surfaces; and at least one coating layer, wherein at least one layer of the at least one coating layer is applied on the first surface, at least one layer of the at least one coating layer is applied on the edge surface and at least one layer of the at least one coating layer is applied on the second surface, wherein the at least one layer of the at least one coating layer applied to the second surface has a lower thermal conductivity than the CMC component, and wherein the at least one layer of the at least one coating layer applied to the edge surface comprises an abradable coating layer wrapping over the edge surface.

2. The CMC component of claim 1, wherein the at least one coating layer comprises a first coating layer disposed on the first surface, the edge surface, and the second surface.

3. The CMC component of claim 2, wherein the at least one coating layer comprises a second coating layer disposed on the first coating layer disposed on the first surface, the edge surface, and the second surface.

4. The CMC component of claim 2, wherein the at least one coating layer comprises a second coating layer disposed on the first coating layer disposed on the first surface and a first portion of the edge surface.

5. The CMC component of claim 1, wherein the at least one coating layer comprises a thermal barrier layer.

6. The CMC component of claim 1, wherein the at least one coating layer comprises an environmental barrier layer.

7. The CMC component of claim 1, wherein the at least one coating layer comprises a machinable coating layer.

8. The CMC component of claim 1, wherein the CMC component is a blade outer air seal (BOAS).

9. A method of thermally shielding a ceramic matric composite (CMC) component for a gas turbine engine to reduce thermal stress, comprising:

applying at least one layer of at least one coating layer to a first surface of the CMC component, the first surface configured for exposure to a hot gas stream;

applying at least one layer of the at least one coating layer to an edge surface of the CMC component disposed between and connecting the first surface and a second surface of the CMC component; and applying at least one layer of the at least one coating layer to the second surface, the second surface disposed opposite the first surface and configured for exposure to a cold gas stream, wherein the at least one layer of the at least one coating layer applied to the second surface has a lower thermal conductivity than the CMC component, and wherein the at least one layer of the at least one coating layer applied to the edge surface comprises an abradable coating layer wrapping over the edge surface.

10. The method of claim 9, wherein applying the at least one coating layer comprises applying a first coating layer onto the first surface, the edge surface, and the second surface.

11. The method of claim 10, wherein applying the at least one coating layer comprises applying a second coating layer onto the first coating layer disposed on the first surface, the edge surface, and the second surface.

12. The method of claim 10, wherein applying the at least one coating layer comprises applying a second coating layer onto the first coating layer disposed on the first surface and a first portion of the edge surface.

13. The method of claim 9, wherein applying the at least one coating layer comprises applying a thermal barrier layer.

14. The method of claim 9, wherein applying the at least one coating layer comprises applying an environmental barrier layer.

15. The method of claim 9, wherein applying the at least one coating layer comprises applying a machinable coating layer.

16. A method of thermally shielding a ceramic matric composite (CMC) blade outer air seal (BOAS) for a gas turbine engine to reduce thermal stress, comprising:

applying at least one layer of at least one coating layer to a first surface of the CMC BOAS, the first surface configured for exposure to a hot gas stream;

applying at least one layer of the at least one coating layer to an edge surface of the CMC BOAS disposed between and connecting the first surface and a second surface of the CMC BOAS; and applying at least one layer of the at least one coating layer to the second surface, the second surface disposed opposite the first surface and configured for exposure to a cold gas stream, wherein the at least one layer of the at least one coating layer applied to the second surface has a lower thermal conductivity than the CMC BOAS, and wherein the at least one layer of the at least one coating layer applied to the edge surface comprises an abradable coating layer wrapping over the edge surface.

* * * * *